United States Patent
Pursifull (10) Patent No.: US 9,273,638 B2
(45) Date of Patent: Mar. 1, 2016

(54) VARIABLE PRESSURE GASEOUS FUEL REGULATOR

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 241 days.

(21) Appl. No.: 13/863,270

(22) Filed: Apr. 15, 2013

(65) Prior Publication Data

US 2014/0305406 A1    Oct. 16, 2014

(51) Int. Cl.
*F02M 21/02* (2006.01)
*F02M 57/02* (2006.01)
(Continued)

(52) U.S. Cl.
CPC ......... *F02M 21/0239* (2013.01); *F02M 21/023* (2013.01); *F02M 21/0236* (2013.01); *F02M 21/0245* (2013.01); *F02M 57/025* (2013.01); *F02M 57/026* (2013.01); *F02M 69/54* (2013.01); *F02M 21/02* (2013.01);
(Continued)

(58) Field of Classification Search
CPC .............. F02M 21/023; F02M 21/236; F02M 21/0239; F02M 21/0245; F02M 2041/1477; F02M 57/025; F02M 57/026; F02M 63/0005; F02M 63/0245; F02M 69/54; F02M 21/02; F02D 19/0673; F02D 19/0678
USPC .......................... 123/434; 137/115.15, 118.06
See application file for complete search history.

(56) References Cited

U.S. PATENT DOCUMENTS

| 4,373,493 A * | 2/1983 | Welsh .................. F02M 13/08 123/525 |
| 4,505,249 A * | 3/1985 | Young .................. F02B 43/00 123/27 GE |

(Continued)

FOREIGN PATENT DOCUMENTS

| DE | EP 2287531 A2 * | 2/2011 | ............. F23D 14/60 |
| EP | 1087281 A1 * | 3/2001 | ......... G05D 16/0683 |

(Continued)

OTHER PUBLICATIONS

Pursifull, Ross Dykstra, "Gaseous Fuel Rail Depressurization During Inactive Injector Conditions," U.S. Appl. No. 13/623,695, filed Sep. 20, 2012, 45 pages.

*Primary Examiner* — Stephen K Cronin
*Assistant Examiner* — Kevin R Steckbauer
(74) *Attorney, Agent, or Firm* — Julia Voutyras; Alleman Hall McCoy Russell & Tuttle LLP (57) ABSTRACT

A system for a gaseous-fueled engine, comprising: a gaseous fuel tank, a first pressure regulator comprising: a high pressure chamber coupled to the gaseous fuel tank, a low pressure chamber coupled to an engine fuel rail, and a reference chamber; a second pressure regulator coupled to the reference chamber; a first valve controlling fuel flow from the gaseous fuel tank to the engine fuel rail; a second valve controlling fuel flow from the second pressure regulator to the reference chamber; and a controller including memory with instructions therein for adjusting the valves based on a desired fuel rail pressure. In this way, the system enables at least two different fuel rail pressures such that peak fuel demand can be satisfied without maintaining peak fuel rail pressure at all times.

10 Claims, 7 Drawing Sheets

(51) Int. Cl.
*F02M 69/54* (2006.01)
*F02M 41/14* (2006.01)
*F02M 63/02* (2006.01)

(52) U.S. Cl.
CPC ... *F02M 63/0245* (2013.01); *F02M 2041/1477* (2013.01); *Y02T 10/32* (2013.01)

(56) References Cited

U.S. PATENT DOCUMENTS

| | | | | |
|---|---|---|---|---|
| 5,367,999 A * | 11/1994 | King | | F02B 43/00 123/458 |
| 5,735,309 A * | 4/1998 | Kariniemi | | G05D 16/0683 137/484.2 |
| 5,967,119 A * | 10/1999 | Burkhard | | F02M 69/54 123/458 |
| 6,502,561 B2 * | 1/2003 | Leung | | F02M 23/00 123/457 |
| 6,695,005 B2 * | 2/2004 | Ottestad | | G05D 16/185 137/488 |
| 6,758,233 B2 * | 7/2004 | Sulatisky | | F02D 41/0027 137/102 |
| 6,945,507 B2 * | 9/2005 | Baarda | | F23N 1/005 137/100 |
| 7,398,763 B2 | 7/2008 | Gibson et al. | | |
| 7,922,833 B2 * | 4/2011 | McMahon | | G05D 16/2093 137/14 |
| 8,096,522 B2 * | 1/2012 | Bachmaier | | G05D 16/2093 251/30.01 |
| 8,166,953 B2 | 5/2012 | Caley | | |
| 8,256,445 B2 * | 9/2012 | Arnett | | G05D 16/16 137/115.15 |
| 8,935,078 B1 * | 1/2015 | Lorts | | F02M 69/54 123/457 |
| 8,936,009 B2 * | 1/2015 | Puckett | | F02D 19/0673 123/525 |
| 2014/0174551 A1 * | 6/2014 | McKay | | G05D 16/0655 137/12 |

FOREIGN PATENT DOCUMENTS

| | | |
|---|---|---|
| EP | 1120561 A2 | 8/2001 |
| JP | H05263698 A | 10/1993 |
| JP | 2002054522 A | 2/2002 |
| JP | 2004156552 A | 6/2004 |

\* cited by examiner

VARIABLE PRESSURE GASEOUS FUEL REGULATOR

BACKGROUND AND SUMMARY

Alternate fuels have been developed to mitigate the rising prices of conventional fuels and for reducing exhaust emissions. Gaseous fuels such as natural gas are emerging as appealing alternative fuels. For automotive applications, natural gas may be compressed and stored as a gas in cylinders at high pressure. A pressure regulator may then be used to supply the compressed natural gas (CNG) at lower pressures to an engine's intake port or engine combustion chamber. The pressure regulator may provide this gaseous fuel at a fixed, constant pressure to the engine, or it may be a variable pressure regulator which can provide gaseous fuel at varying pressures to the engine.

Fixed pressure regulators are commonly used in gaseous-fueled vehicles, but have several disadvantages. Supplying fuel at a fixed, constant pressure limits the dynamic range of the associated fuel injector. As such, even at low fuel demands, the quantity of fuel injected remains the same. This causes the fuel injector to be exposed to high pressures throughout operation, affecting the durability of the injector. In contrast, by using a variable pressure regulator, the dynamic range (or turn down ratio) of the injector can be increased. Providing a lower fuel pressure during low fuel demand allows for a longer fuel injection pulse width, which in turn allows for injections of lower, repeatable mass. Further, varying the pressure of gaseous fuel enables use of a lower pressure of gaseous fuel during engine cold start when only a marginal voltage may be available to open the injectors. Additionally, varying the pressure may allow rare, peak fuel demands to be satisfied without having to subject the injector to the durability challenge of injecting high pressure gaseous fuel at all times.

Despite these potential advantages, known variable pressure regulators are costly and prone to instability. For example, in some systems, variable pressure regulation is achieved by exposing the reference chamber of the regulator to intake manifold pressure. However, this dependency on intake manifold pressure limits the operability of the pressure regulator when intake manifold vacuum is not within a certain range. In other systems, pressure variability is achieved by changing the reference pressure via a valve from the high pressure source. As another example, one known variable pressure regulator varies the pressure of gaseous fuel by duty cycling a main valve between the regulator and the fuel rail. However, systems which rely on a single valve to perform pressure regulation, where the valve is subject to a flow of high pressure gaseous fuel, may not be adequately robust. Further, such systems require electronic pressure feedback to actuate the valve.

In one example some of the above issues may be addressed by a system for a gaseous-fueled engine, comprising: a gaseous fuel tank, a first pressure regulator comprising: a high pressure chamber coupled to the gaseous fuel tank, a low pressure chamber coupled to an engine fuel rail, and a reference chamber; a second pressure regulator coupled to the reference chamber; a first valve controlling fuel flow from the gaseous fuel tank to the engine fuel rail; a second valve controlling fuel flow from the second pressure regulator to the reference chamber; and a controller including memory with instructions therein for adjusting the valves based on a desired fuel rail pressure. In this way, the first valve may be actuated to supply gaseous fuel to the engine fuel rail at a pressure determined by the properties of the first pressure regulator. Then, in response to an increase in desired fuel rail pressure, the second valve may be actuated. The actuation of the second valve allows gaseous fuel to flow through the second pressure regulator into the reference chamber, thereby increasing the pressure of the reference chamber and low pressure chamber at a pressure determined by the properties of the second pressure regulator. Thus, the system enables at least two different fuel rail pressures such that peak fuel demand can be satisfied without maintaining peak fuel rail pressure at all times.

In another example, some of the above issues may be addressed by a method for regulating gaseous fuel pressure in an engine, comprising: increasing a regulating pressure in a low pressure chamber of a first pressure regulator by controllably increasing the flow of gaseous fuel into a reference chamber of the first pressure regulator via a second pressure regulator. In this way, multiple different fuel rail pressures may be set by altering the pressure in the reference chamber of the first pressure regulator. The flow of gaseous fuel may be controlled by valves in response to changes in desired fuel rail pressure without relying on mechanical pressure feedback to actuate or de-actuate the valves.

In still another example, some of the above issues may be addressed by a method for an engine cold start, comprising: closing a valve coupling a gaseous fuel tank to a high pressure chamber of a first gaseous fuel regulator and opening a valve coupling a fuel rail to a reference chamber of the first gaseous fuel regulator via a second gaseous fuel regulator. In this way, the gaseous fuel already present in the fuel rail may be used to establish a low injection pressure that may be used when marginal voltage is available to open the fuel injectors, as a lower injection pressure requires a lower injector opening voltage.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
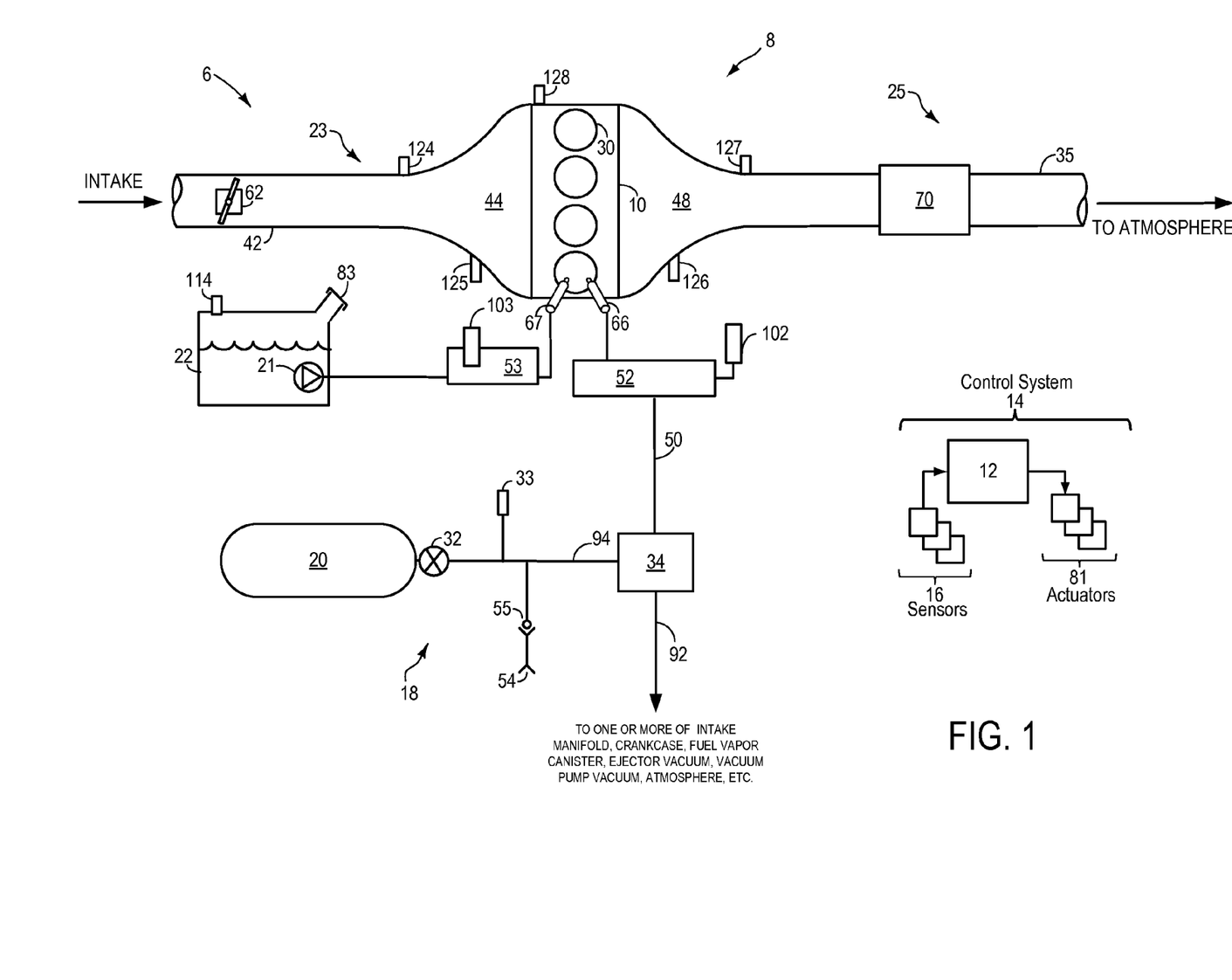
FIG. 1 shows a schematic depiction of an engine system configured to operate on a gaseous fuel.
Figure 3:
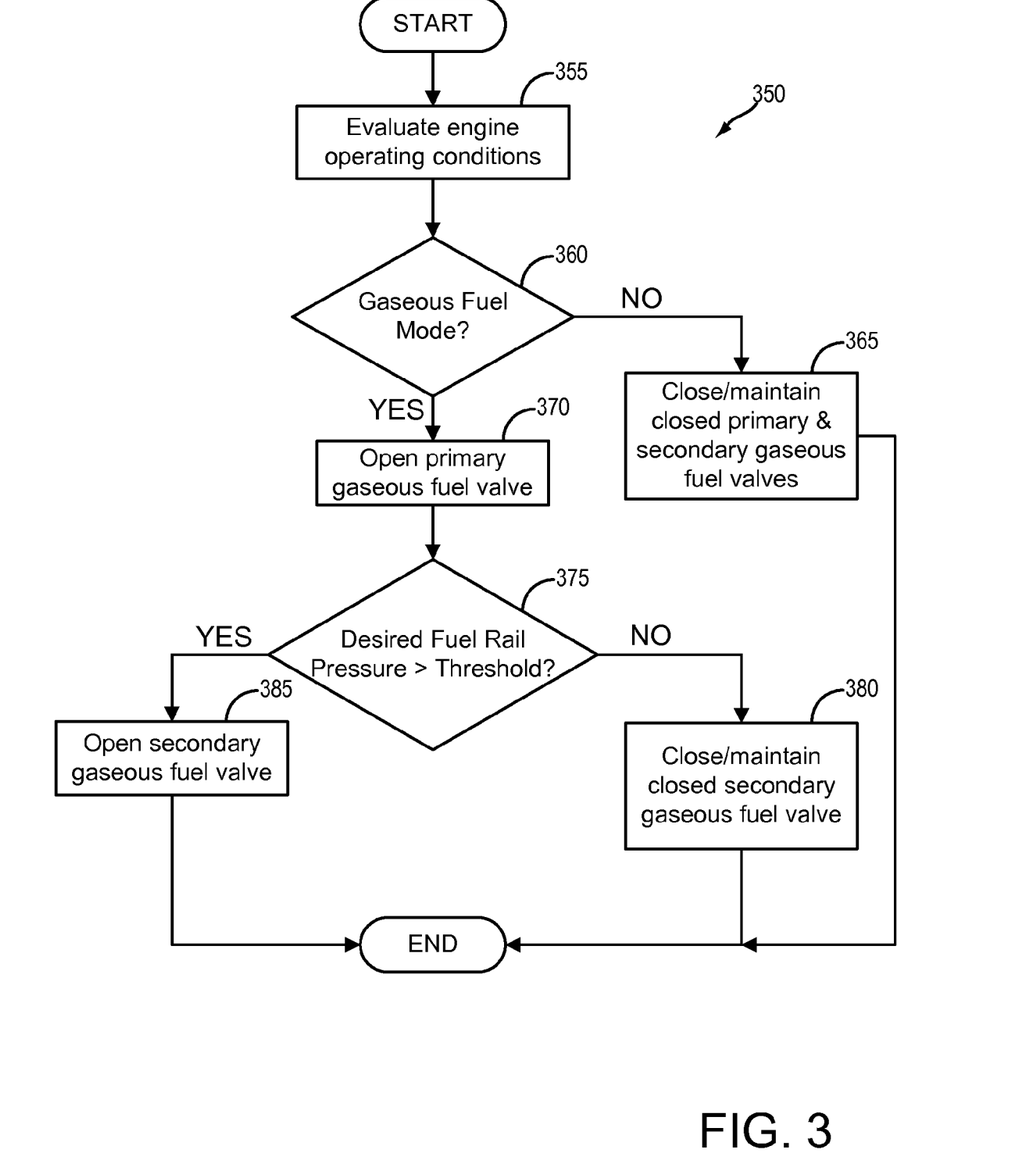
FIG. 3 shows an example high level flowchart for controlling valves of the pressure regulation system of FIGS. 2A-B.
Figure 4:
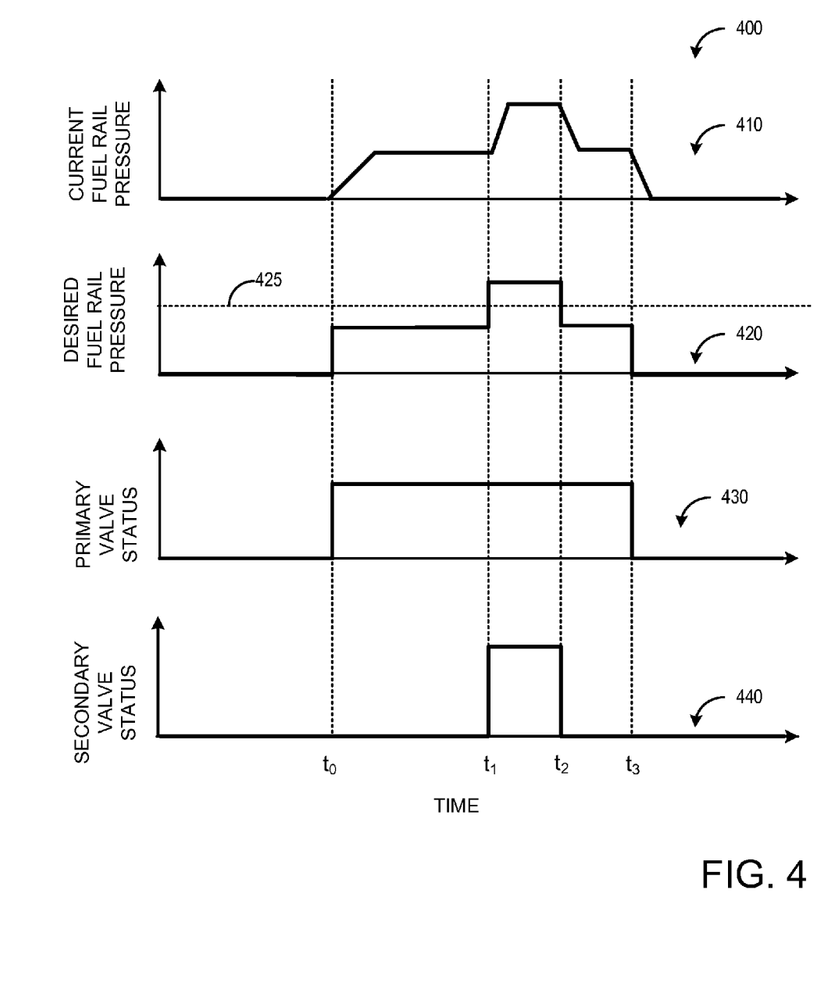
FIG. 4 shows example timing diagrams illustrating the relationship between various parameters of the pressure regulation system of FIGS. 2A-B with respect to time.

Systems and methods are provided for a variable pressure regulator for controlling the pressure of gaseous fuel in a fuel rail of a gaseous-fueled vehicle, such as the vehicle of FIG. 1. The variable pressure regulator may comprise one or more gaseous pressure regulators coupled to one or more valves, as depicted in FIGS. 2A-2B and 5A-5B. A controller may be configured to perform a control routine, such as the example control routines depicted in FIGS. 3 and 6. Example timing diagrams for the implementation of such systems and control routines are shown in FIGS. 4 and 7. In this way, multiple fuel injection pressures may be established through mechanical means at low cost.

FIG. 1 shows a schematic depiction of a vehicle system 6. The vehicle system 6 includes an engine system 8, a control system 14, and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere upon passage through an emission control device 70. Engine 10 may further include a crankcase encasing a crankshaft (not shown), the crankshaft driven by the movement of pistons of cylinders 30. It will be appreciated that other components may be included in the engine such as a variety of valves and sensors.

Control system 14 is shown receiving information from a plurality of sensors 16 (various examples of which are described herein) and sending control signals to a plurality of actuators 81 (various examples of which are described herein). As one example, sensors 16 may include MAP and MAF sensors 124 and 125 in the intake, exhaust gas sensor 126 and temperature sensor 127 located in the exhaust, temperature sensor 128 located in the engine, pressure sensor 33 coupled to a gaseous fuel line, pressure sensor 102 coupled to a gaseous fuel rail, etc. Other sensors such as pressure, temperature, fuel level, air/fuel ratio, and composition sensors may be coupled to various locations in the vehicle system 6. As another example, the actuators may include fuel pump 21, fuel injector 66, throttle 62, fuel tank valve 32, and the valves of pressure regulation system 34. Examples of pressure regulation systems are described further below with regards to FIGS. 2A-2B and FIGS. 5A-5B. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 3 and 6.

Fuel system 18 may include one or more fuel tanks. In the depicted example, the fuel system is a dual-fuel system including a high pressure fuel tank 20 configured to deliver a gaseous fuel to a fuel rail 52 via a pressure regulation system 34. Fuel tank 20 may be configured to store a gaseous fuel at high pressure and deliver the fuel to the engine 10 via high pressure fuel line 94, pressure regulation system 34, and regulated pressure fuel line 50. For example, the gaseous fuel may be compressed natural gas (CNG), liquefied petroleum gas (LPG), absorbed natural gas (ANG), or hydrogen fuel. Fuel tank 20 may store the gaseous fuel in a pressure range of 10-700 bar (e.g., 0-100+ psi for LNG fuel, 500 psi for ANG fuel, 3600 psi, or 250 bar, for CNG fuel, and 5000-10,000 psi for hydrogen fuel).

Fuel tank 20 may be refilled with gaseous fuel via fueling port 54. A check valve 55 (or two check valves in series for redundancy) may be coupled between fuel tank 20 and fueling port 54 to ensure correct flow of fuel. Fuel may be delivered from fuel tank 20 to the injectors of engine 10, such as example injector 66 via fuel rail 52. While only a single injector coupled with fuel rail 52 is depicted, it will be appreciated that additional injectors are provided for each cylinder 30. In one example, where fuel system 18 includes a direct injection system, injector 66 may be configured as a direct fuel injector. In an alternate embodiment, fuel system 18 may include a port injection system wherein injector 66 may be configured as a port fuel injector. In still other embodiments, each cylinder may include one or more injectors including a direct injector and a port injector.

Fuel tank 20 may be coupled to fuel tank valve 32 for regulating a pressure of the gaseous fuel delivered into fuel line 94. Fuel tank valve 32 may be configured to deliver the gaseous fuel into fuel line 94 at a pressure that is similar to tank pressure Alternatively, even when a high fuel injection pressure is desired, the fuel tank valve may be activated and a pressure regulation system downstream of the valve may be controlled to ensure that the fuel rail pressure is regulated to a sufficiently high pressure. Such operation may be preferable in examples where high pressure gaseous fuel flow through various components that may be included fuel line 94 (e.g., filters, valves, etc) would degrade the components.

Fuel tank 20 may further be coupled to a pressure regulation system 34 to enable gaseous fuel to be provided to fuel rail 52 and from there to injector 66 at variable pressures. In one example, fuel tank 20 may store gaseous fuel in a pressure range of 10-700 bar, while pressure regulation system 34 may regulate the fuel rail pressure to a variable range of 2 to 40 bar (e.g., 2 to 10 bar for CNG fuel). As described further below with regards to FIGS. 2A-2B and FIGS. 5A-5B, pressure regulation system 34 may be coupled to a pressure relief conduit 92. Pressure relief conduit 92 may couple the reference chamber with one or more of the intake manifold, crankcase, fuel vapor canister, ejector vacuum, vacuum pump vacuum, or atmosphere.

Fuel system 18 may also include fuel tank 22 configured to deliver a fuel having chemical and physical properties different from the gaseous fuel (e.g. a liquid fuel) to fuel rail 53. While the depicted example includes separate fuel rails for the two different fuels, in some examples a common fuel rail may be used. Fuel tank 22 may store liquid fuel such as gasoline, fuel with a range of alcohol concentrations, various gasoline-ethanol fuel blends (e.g. E10, E85), and/or combinations thereof. As shown, fuel tank 22 may be coupled to a fuel pump 21 for pressurizing fuel delivered to fuel rail 53. Fuel tank 22 may include pressure sensor 114, and may also include fueling port 83, which may be utilize to refill fuel tank 22 with liquid fuel.

Fuel rail 53 may be coupled to fuel injector 67. Fuel may be delivered from fuel tank 22 to injector 67 via fuel rail 53. While only a single injector coupled with each fuel rail is depicted, it will be appreciated that additional injectors are provided for each cylinder 30. In one example, where fuel system 18 includes a direct injection system, injector 67 may be configured as a direct fuel injector. In an alternate embodiment, fuel system 18 may include a port injection system wherein injector 67 may be configured as a port fuel injector. In still other embodiments, each cylinder may include one or more injectors including a direct injector and a port injector.

Pump 21 may not pump fuel from fuel tank 22 to fuel rail 53 during conditions where liquid fuel delivery to the engine is not desired (e.g., during engine off conditions, or during conditions where delivery of gaseous fuel alone to the engine is desired). A fuel rail pressure sensor 103 in fuel rail 53 may be configured to sense the current fuel rail pressure and provide the sensed value to controller 12 of control system 14. In some examples, pump 21 may be controlled based on the fuel rail pressure sensed by sensor 103, and/or based on other parameter values. Further, in some embodiments, a check valve (not shown) may be positioned between fuel tank 22 and fuel rail 53 to ensure correct flow of fuel from fuel tank 22.

Figure 2A:
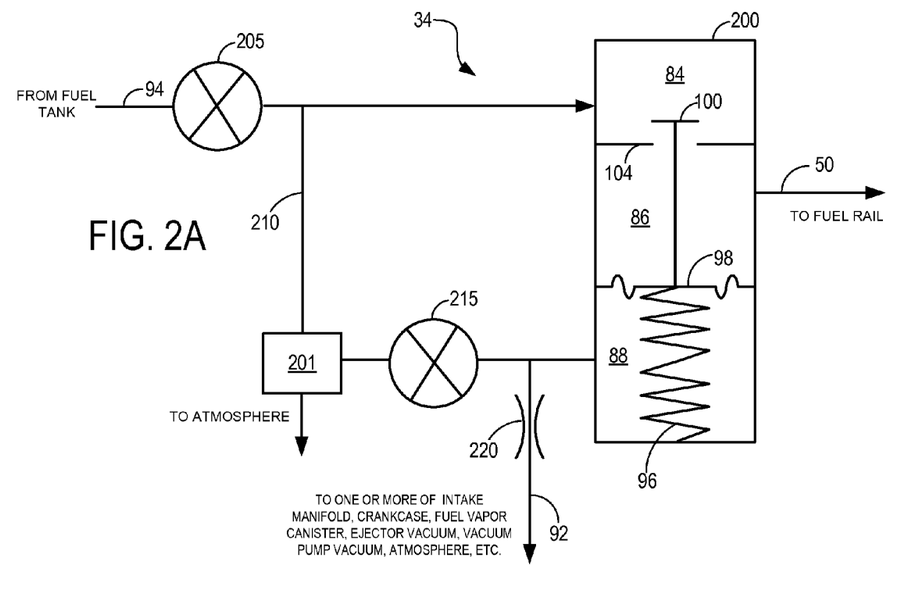
FIG. 2A shows a schematic depiction of a pressure regulation system for regulating the pressure of a gaseous fuel rail.
Figure 2B:
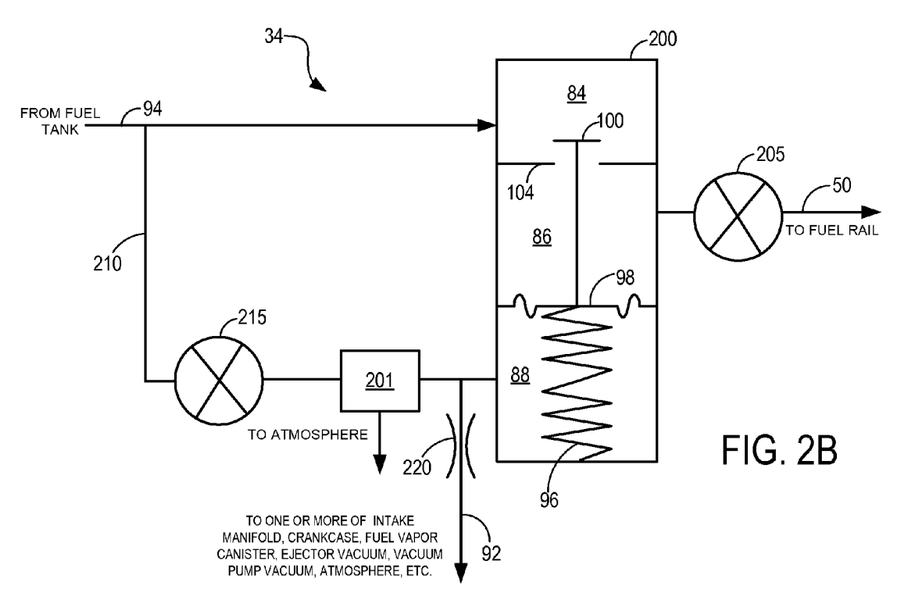
FIG. 2B shows a schematic depiction of a pressure regulation system for regulating the pressure of a gaseous fuel rail.
Figure 5A:
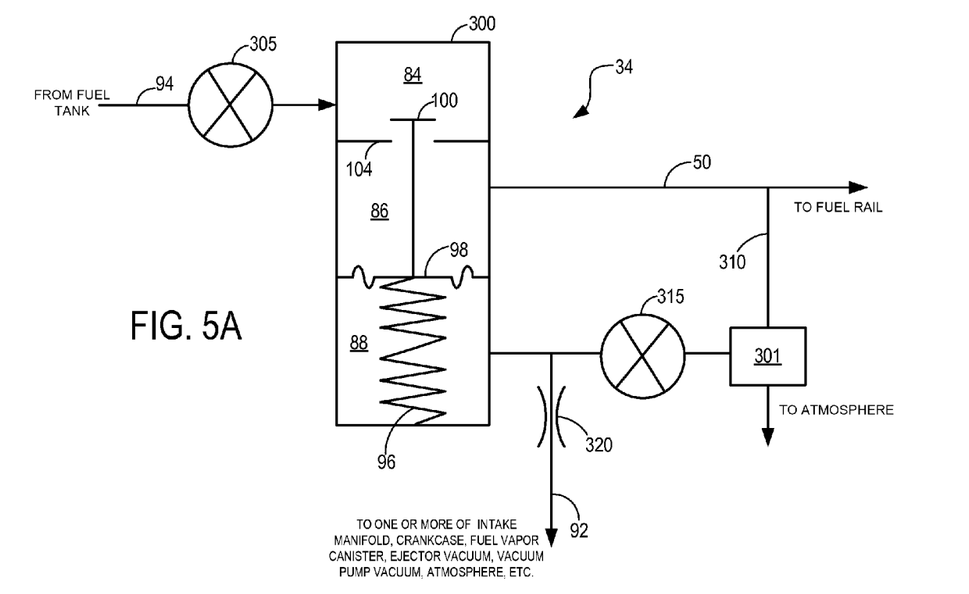
FIG. 5A shows a schematic depiction of a pressure regulation system for regulating the pressure of a gaseous fuel rail.
Figure 5B:
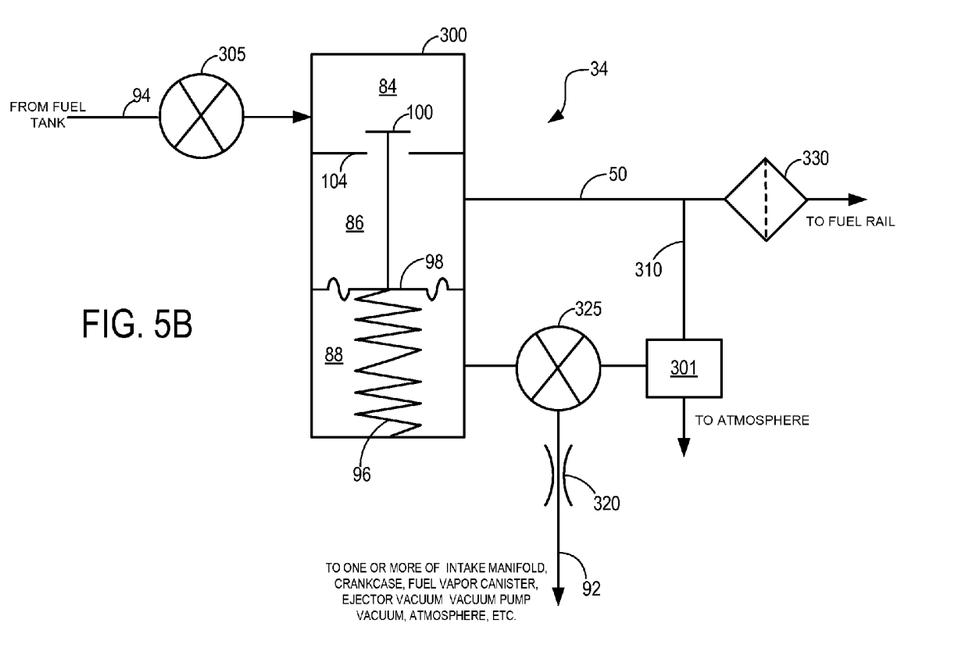
FIG. 5B shows a schematic depiction of a pressure regulation system for regulating the pressure of a gaseous fuel rail.

FIGS. 2A and 2B show detailed schematic drawings of example pressure regulation systems, such as pressure regulation system 34 depicted in FIG. 1. Other examples are shown in FIGS. 5A and 5B and are discussed further below. Pressure regulation system 34 includes high pressure regulator 200 and a low pressure regulator 201. High pressure regulator 200 includes a high pressure chamber 84 which receives gaseous fuel from fuel tank 20 via fuel line 94, a low pressure chamber 86 which provides pressure-regulated gaseous fuel to fuel rail 52 via regulated fuel line 50, and a reference chamber 88. Similar to a mechanical pressure regulator, high pressure regulator 200 includes diaphragm 98 and valve 100. A position of valve 100 relative to an aperture in wall 104 separating high pressure chamber 84 and low pressure chamber 86 determines the flow rate of gas from high pressure chamber 84 to low pressure chamber 86. The position of valve 100 depends on the pressures in reference chamber 88 and low pressure chamber 86, and on spring force provided by spring 96 coupled to a bottom of high pressure regulator 200 on one end and to a bottom of diaphragm 98 on the other end. As the pressure in the reference chamber increases, a greater pressure is needed in low pressure chamber 86 to achieve any given position of valve 100. For example, the high pressure chamber may communicate with the low pressure chamber via the aperture when a pressure in the reference chamber exceeds a threshold, the threshold corresponding to a pressure at which the diaphragm moves the valve 100 above wall 104. As the pressure in the reference chamber decreases, a lower pressure is needed in low pressure chamber 86 to achieve a force balance.

However, unlike mechanical pressure regulators which control a reference chamber pressure to a fixed, constant pressure to achieve a fixed, constant regulating pressure in a low pressure chamber, pressure regulation system 34 couples low pressure regulator 201 to reference chamber 88 enabling variation of the reference chamber pressure, the reference chamber pressure in turn varying the regulating pressure in low pressure chamber 86.

Under most conditions when gaseous fuel tank 20 is fluidly coupled to pressure regulation system 34, high pressure chamber 84 will contain gaseous fuel at a higher pressure than the gaseous fuel contained in low pressure chamber 86. Gaseous fuel stored at a high pressure in gaseous fuel tank 20 flows to high pressure chamber 84 via high pressure fuel line 94. A quantity of gaseous fuel in high pressure chamber 84 may then be directed to low pressure chamber 86 through valve 100 such that the pressure of gaseous fuel in low pressure chamber 86 is lower than the pressure of gaseous fuel in high pressure chamber 84. In this way, a gaseous fuel may be directed to regulated fuel line 50 and further to fuel rail 52 at a pressure that is substantially lower than the fuel pressure in high pressure fuel line 94 and gaseous fuel tank 20.

In the examples shown in FIGS. 2A and 2B, pressure regulation system 34 includes primary valve 205. In these examples, pressure regulation system 34 includes secondary fuel line 210. Low pressure regulator 201 and secondary valve 215 are shown coupled to secondary fuel line 210. Pressure relief conduit 92 is also shown coupled to secondary fuel line 210. Pressure relief conduit 92 may include orifice 220. Orifice 220 may be a fixed or variable aperture orifice. In some examples, orifice 220 may be replaced by a controllable valve.

Low pressure regulator 201 may include ports for input pressure, output pressure and a reference pressure. As shown in FIGS. 2A and 2B, a conduit may connect a reference chamber of low pressure regulator to atmosphere. In other examples, low pressure regulator 201 may have a self-connected reference pressure. In these examples, a pressure relief conduit providing a constant leak may not be required, as the low pressure regulator may be able to both increase and decrease downstream pressure in reference chamber 88.

In the example depicted in FIG. 2A, primary valve 205 is shown coupled to high pressure fuel line 94 upstream of the take-off for secondary fuel line 210. Primary valve 205 may be actuated and de-actuated via signals from controller 12. When primary valve 205 is commanded open, gaseous fuel in high pressure fuel line 94 can flow to high pressure chamber 84 of high pressure regulator 200, and can also flow to low pressure regulator 201 via secondary fuel line 210.

In the example depicted in FIG. 2A, secondary valve 215 is coupled to secondary fuel line 210 downstream of low pressure regulator 201. While primary valve 205 is open, if secondary valve 215 is opened, gaseous fuel may flow from the low pressure regulator into reference chamber 88 of high pressure regulator 200. In this way, pressure may be increased in the reference chamber. Increased pressure in the reference chamber raises the pressure of fuel in low pressure chamber 86 (the regulating pressure) due to the movement of diaphragm 98 towards wall 104. This in turn will increase the pressure of fuel directed to regulated fuel line 50 and downstream to fuel rail 52. If secondary valve 215 is then closed, gaseous fuel may be evacuated out of the reference chamber to pressure relief conduit 92 via orifice 220. In this way, the reference chamber will return to steady-state pressure, thereby decreasing the regulating pressure in low pressure chamber 86. This in turn will decrease the pressure of fuel directed to regulated fuel line 50 and downstream to fuel rail 52. The gaseous fuel exhausted from the reference chamber via the closing of secondary valve 215 may be directed to engine system 8 via pressure relief conduit 92, for example to intake manifold 44, a crankcase, ejector vacuum, or vacuum pump vacuum, or to a fuel vapor storage canister. Alternatively, the evacuated gaseous fuel may be discarded to atmosphere.

In the example depicted in FIG. 2B, primary valve 205 is coupled to regulated fuel line 50 upstream of high pressure regulator 200. Primary valve 205 may be actuated and de-actuated via signals from controller 12. When coupled to the regulated fuel line, primary valve 205 may function as a fuel rail lock-off valve, and may be closed to prevent communication between pressure regulation system 34 and fuel rail 52 during conditions where gaseous fuel delivery to the engine is not desired (e.g., during engine off conditions, or during conditions where delivery of liquid fuel alone to the engine is desired). Otherwise, primary valve 205 may be opened such that fuel may be delivered from pressure regulation system 34 to fuel rail 52. In contrast to valves in systems which vary fuel rail pressure via duty cycling of a valve intermediate a pressure regulator and a fuel rail, primary valve 205 may be a simple valve which is only controllable to a fully open or fully closed state, and which does not serve to vary the pressure of fuel delivered to the fuel rail. However, in other examples, pressure regulation system 34 may duty-cycle primary valve 205 based on feedback from the fuel rail pressure sensor, such that the valve works in conjunction with or replaces the other pressure-regulating mechanisms of the systems during select operating conditions.

In the example depicted in FIG. 2B, secondary valve 215 is coupled to secondary fuel line 210 upstream of low pressure regulator 201. While primary valve 205 is open, if secondary valve 215 is opened, gaseous fuel may flow from the fuel tank to the low pressure regulator and further into reference chamber 88 of high pressure regulator 200. In this way, pressure may be increased in the reference chamber. Increased pressure in the reference chamber raises the pressure of fuel in low pressure chamber 86 (the regulating pressure) due to the movement of diaphragm 98 towards wall 104. This in turn will increase the pressure of fuel directed to regulated fuel line 50 and downstream to fuel rail 52. If secondary valve 215 is then closed, gaseous fuel may be evacuated out of the reference chamber to pressure relief conduit 92 via orifice 220. In this way, the reference chamber will return to steady-state pressure, thereby decreasing the regulating pressure in low pressure chamber 86. This in turn will decrease the pressure of fuel directed to regulated fuel line 50 and downstream to fuel rail 52. By closing valve 215, reference chamber 88 ceases to be replenished, and reference chamber 88 will equilibrate to the same pressure as seen by conduit 92. The gaseous fuel exhausted from reference chamber 88 via pressure relief conduit 92 may be directed to engine system 8, for example to intake manifold 44, a crankcase, ejector vacuum, vacuum pump vacuum, or to a fuel vapor storage canister. Alternatively, the evacuated gaseous fuel may be discarded to atmosphere.

It should be understood that the terms "high pressure regulator" and "Low pressure regulator" (and/or "higher pressure regulator" and "lower pressure regulator" are used herein to describe the regulators in terms of the relative pressures of gaseous fuel exiting the regulators. In other words, under most circumstances, gaseous fuel exiting the high pressure regulator is regulated to a higher pressure than gaseous fuel exiting the low pressure regulator. In one example, the high pressure regulator may be a 7 bar regulator and the low pressure regulator may be a 3 bar regulator. In the examples depicted in FIGS. 2A and 2B, if primary valve 205 is open and secondary valve 215 is closed, gaseous fuel exiting low pressure chamber 86 will exit at a pressure of 7 Bar. If secondary valve 215 is then open, gaseous fuel will flow into reference chamber 88 at a pressure of 3 bar. In turn, gaseous fuel exiting low pressure chamber 86 will exit at a pressure of 10 Bar.

Pressure regulation system 34 may regulate fuel rail pressure based on electronic feedback from the fuel rail. Fuel rail pressure sensor 102 may be configured to sense the current fuel rail pressure and provide the sensed value to controller 12 of control system 14. If the current fuel rail pressure is not within a range of a desired fuel rail pressure determined based on engine operating conditions, the controller may control valves 205 and 215 to achieve the desired fuel rail pressure. An example control routine for the example pressure regulation systems depicted in FIGS. 2A and 2B is shown in FIG. 3.

The variable pressure regulators shown in FIGS. 2A and 2B (as well as the variable pressure regulators shown in FIGS. 5A and 5B) may enable a system for a gaseous-fueled engine, comprising: a gaseous fuel tank, a first pressure regulator comprising: a high pressure chamber coupled to the gaseous fuel tank, a low pressure chamber coupled to an engine fuel rail, and a reference chamber; a second pressure regulator coupled to the reference chamber; a first valve controlling fuel flow from the gaseous fuel tank to the engine fuel rail; a second valve controlling fuel flow from the second pressure regulator to the reference chamber; and a controller including memory with instructions therein for adjusting the valves based on a desired fuel rail pressure. In some examples, the first pressure regulator is a higher pressure regulator and the second pressure regulator is a lower pressure regulator. The system may further comprise a first fuel line coupling the gaseous fuel tank to the high pressure chamber, and a second fuel line coupling the gaseous fuel tank to the reference chamber via the second pressure regulator and second valve, and may further comprise a pressure relief conduit coupled to the second fuel line downstream of the second pressure regulator and second valve, and upstream of the reference chamber. The controller may further include memory with instructions therein for, when the first valve is actuated, actuating the second valve in response to an increase in desired fuel rail pressure, and may further include memory with instructions therein for, when the first and second valves are actuated, de-actuating the second valve in response to a decrease in desired fuel rail pressure.

In some examples, the fuel exhausted from the reference chamber through the pressure relief conduit is routed to the engine for combustion. The system may further comprise a first fuel line coupling the low pressure chamber to the engine fuel rail, and a second fuel line coupling the engine fuel rail to the reference chamber via the second pressure regulator and second valve, and may further comprise a pressure relief conduit coupled to the second fuel line downstream of the second pressure regulator and second valve, and upstream of the reference chamber. The controller may further include memory with instructions therein for actuating the second valve in response to an increase in desired fuel rail pressure, and may further include memory with instructions therein for de-actuating the second valve in response to a decrease in desired fuel rail pressure.

In this way, the first valve may be actuated to supply gaseous fuel to the engine fuel rail at a pressure determined by the properties of the first pressure regulator. Then, in response to an increase in desired fuel rail pressure, the second valve may be actuated. The actuation of the second valve allows gaseous fuel to flow through the second pressure regulator into the reference chamber, thereby increasing the pressure of the reference chamber and low pressure chamber at a pressure determined by the properties of the second pressure regulator. Thus, the system enables at least two different fuel rail pressures such that peak fuel demand can be satisfied without maintaining peak fuel rail pressure at all times.

FIG. 3 shows a high-level flow chart for an example method 350 for a gaseous pressure regulator for a gaseous fuel system, such as the fuel system depicted in FIG. 1 including a gaseous fuel pressure regulator, such as pressure regulation system 34 as depicted in FIGS. 2A and 2B. Method 350 may be carried out by controller 12, and may be run when the vehicle is operating, or at a key-on event. Method 350 may begin at 355 by determining engine operating conditions. Engine operating conditions may be measured, estimated or inferred, and may include various vehicle conditions, such as vehicle speed, as well as various engine operating conditions, such as engine operating mode, engine speed, engine temperature, exhaust temperature, boost level, MAP, MAF, torque demand, horsepower demand, etc.

Continuing at 360, method 350 may include determining whether the vehicle is in a gaseous fuel operation mode, or the vehicle is about to enter a gaseous fuel mode. The gaseous fuel mode may include a gaseous-fuel only mode, a bi-fuel operation mode, a hybrid-electric-gaseous fuel mode, or other operating mode where gaseous fuel is injected into at least one combustion cylinder.

If the vehicle is not operating in a gaseous fuel mode, and the vehicle is not imminently entering a gaseous fuel mode, method 350 may proceed to 365. At 365, method 350 may include closing or maintaining closed the primary and secondary gaseous fuel valves (e.g. primary gaseous fuel valve 205 and secondary gaseous fuel valve 215 as depicted in FIGS. 2A and 2B). If either or both valves are open, controller 12 may actuate the valves closed, uncoupling gaseous fuel tank 20 from gaseous fuel rail 52. Method 350 may then end.

If the vehicle is in a gaseous fuel mode, or about to enter a gaseous fuel mode, method 350 may proceed to 370. At 370, method 350 may include opening primary gaseous fuel valve 205. Opening the primary gaseous fuel valve 205 couples gaseous fuel tank 20 to gaseous fuel rail 52 and allows gaseous fuel to enter regulated fuel line 50 at a pressure determined by high pressure regulator 200.

At 375, method 350 may include determining is the desired fuel rail pressure is greater than a threshold. The desired fuel rail pressure may be calculated or estimated based on engine operating conditions, such as engine mode, available fuel levels, engine torque demand, engine power demand, etc. The threshold fuel rail pressure may be a predetermined value, or may be calculated as a function of current engine conditions. If the desired fuel rail pressure is not greater than the threshold pressure, method 350 may proceed to 380.

At 380, method 350 may include closing or maintaining closed secondary gaseous fuel valve 215. In this way, low pressure regulator 201 is decoupled from reference chamber 88. If gaseous fuel had been directed into reference chamber 88, the fuel may then be bled out of reference chamber 88 through pressure relief conduit 92 via orifice 220. In this way, reference chamber 88 will obtain a pressure substantially equal to atmospheric pressure. This will in turn cause the pressure in low pressure chamber 86 to drop, due to the movement of diaphragm 98 away from wall 104. In turn, gaseous fuel entering regulated fuel line 50 and further to fuel rail 52 will be supplied at a pressure substantially equal to the pre-set value for high pressure regulator 200. Method 350 may then end.

If the desired fuel rail pressure is greater than the threshold pressure, method 350 may proceed to 385. At 385, method 350 may include opening or maintaining open secondary gaseous fuel valve 215. In this way, low pressure regulator 201 is coupled to reference chamber 88. Fuel from gaseous fuel tank 20 may enter low pressure regulator 201 via secondary fuel line 210. This in turn will cause the pressure in reference chamber 88 to increase by an amount substantially equal to the pre-set value for low-pressure regulator 201. This will further increase the pressure in low pressure chamber 86 due to the movement of diaphragm 98 towards wall 104. This in turn will increase the pressure of fuel directed to regulated fuel line 50 and downstream to fuel rail 52. The pressure of fuel directed to regulated fuel line 50 and downstream to fuel rail 52 may be substantially equal to the sum of the pre-set values of high-pressure regulator 200 and low pressure regulator 201. Method 350 may then end.

Method 350 may further include determining if the desired fuel rail pressure remains above the threshold pressure. If the desired fuel rail pressure remains above the threshold pressure, method 350 may include maintaining the primary and secondary gaseous fuel valves in an open conformation. Method 350 may then end. If the desired fuel rail pressure has dropped below the threshold, method 350 may include closing secondary gaseous fuel valve 215. In this way, low pressure regulator 201 is decoupled from reference chamber 88. Gaseous fuel may then be bled out of reference chamber 88 through pressure relief conduit 92 via orifice 220. In this way, reference chamber 88 will obtain a pressure substantially equal to atmospheric pressure, or the pressure seen by relief conduit 92. This will in turn cause the pressure in low pressure chamber 86 to drop, due to the movement of diaphragm 98 away from wall 104. In turn, gaseous fuel entering regulated fuel line 50 and further to fuel rail 52 will be supplied at a pressure substantially equal to the pre-set value for high pressure regulator 200. Method 350 may then end.

The high level flowchart shown in FIG. 3 (as well as the high level flowcharts shown in FIGS. 6 and 8) may enable one or more methods. In one example, a method for regulating gaseous fuel pressure in an engine, comprising: increasing a regulating pressure in a low pressure chamber of a first pressure regulator by controllably increasing the flow of gaseous fuel into a reference chamber of the first pressure regulator via a second pressure regulator. In some examples, increasing the regulating pressure in the low pressure chamber of the first pressure regulator further increases the pressure of gaseous fuel in a fuel rail of the engine. The method may further comprise decreasing a regulating pressure in the low pressure chamber of the first pressure regulator by closing a first valve coupling the reference chamber to a gaseous fuel tank via the second pressure regulator. In some examples, decreasing a regulating pressure in the low pressure chamber of the first pressure regulator further comprises exhausting gaseous fuel out of the reference chamber through a pressure relief conduit. In some examples, the reference chamber and second pressure regulator are coupled to the fuel rail via a second valve. The method may further comprise adjusting the regulating pressure in the low pressure chamber based on a desired fuel rail pressure. In some examples, the second valve couples the second pressure regulator and the reference chamber to the pressure relief conduit.

In this way, multiple different fuel rail pressures may be set by altering the pressure in the reference chamber of the first pressure regulator. The flow of gaseous fuel may be controlled by valves in response to changes in desired fuel rail pressure without relying on mechanical pressure feedback to actuate or de-actuate the valves.

FIG. 4 shows an example timing diagram 400 illustrating the relationship between various parameters of the pressure regulation system of FIGS. 2A-B with respect to time. The timing diagram may be representative of an example pressure regulation routine, such as method 350 depicted in FIG. 3. Timing diagram 400 includes current fuel rail pressure plot 410, desired fuel rail pressure plot 420, primary valve status plot 430 and secondary valve status plot 440.

Prior to $t_0$, the vehicle may be off, or running in a mode that does not require gaseous fuel injection. At $t_0$, the desired fuel rail pressure increases from 0 to a value less than threshold 425. In response to this increase in desired fuel rail pressure, a primary gaseous fuel valve is actuated, as shown by plot 430. As shown by plot 410, the actuation of the primary valve causes the fuel rail pressure to increase to the desired fuel rail pressure. In this example, actuating the primary valve is equivalent to opening the valve at 100% duty cycle. In some examples, the valve may be opened to various duty cycles to further control the fuel rail pressure.

At $t_1$, the desired fuel rail pressure increases to a value greater than threshold 425. This may be due to a change in operating conditions, for example, an increased engine torque demand. In response to the increase in desired fuel rail pressure, a secondary gaseous fuel valve is actuated, as shown by plot 440. Concurrently, the primary gaseous fuel valve is maintained open. As shown by plot 410, the actuation of the secondary valve causes the fuel rail pressure to increase to the desired fuel rail pressure. In this example, actuating the secondary valve is equivalent to opening the valve at 100% duty cycle. In some examples, the valve may be opened to various duty cycles to further control the fuel rail pressure. As described above in reference to FIG. 2, actuation of the secondary valve cause gaseous fuel to flow into the reference chamber of the high pressure fuel regulator, increasing the pressure of the gaseous fuel entering the fuel rail.

At time $t_2$, the desired fuel rail pressure decreases to a value less than threshold 425. This may be due to a change in operating conditions, for example, a decreased engine torque demand. In response to the decrease in desired fuel rail pressure, the secondary gaseous fuel valve is closed, as shown by plot 440. Concurrently, the primary gaseous fuel valve is maintained open. As shown by plot 410, the closing of the secondary valve causes the fuel rail pressure to decrease to the desired fuel rail pressure. As described above in reference to FIG. 2, closing the secondary valve causes gaseous fuel to bleed out of the reference chamber of the high pressure fuel regulator through a pressure relief conduit. This decreases the pressure of gaseous fuel entering the fuel rail.

At time $t_3$, the desired fuel rail pressure decreases to 0. This may be due to a change in operating conditions, for example, a key-off event, or the switching of engine modes. In response to the decrease in desired fuel rail pressure, the primary gaseous fuel valve is closed, as shown by plot 430. Closing the primary gaseous fuel valve decouples the gaseous fuel tank from the gaseous fuel rail. As shown by plot 410, the closing of the primary gaseous fuel valve causes the fuel rail pressure to decrease to 0.

FIGS. 5A and 5B show detailed schematic drawings of alternative example pressure regulation systems, such as pressure regulation system 34 depicted in FIG. 1. As described with regards to FIGS. 2A and 2B, pressure regulation system 34 includes high pressure regulator 300 and a low pressure regulator 301. High pressure regulator 300 includes a high pressure chamber 84 which receives gaseous fuel from fuel tank 20 via fuel line 94, a low pressure chamber 86 which provides pressure-regulated gaseous fuel to fuel rail 52 via regulated fuel line 50, and a reference chamber 88. High pressure regulator 300 includes diaphragm 98 and valve 100. A position of valve 100 relative to an aperture in wall 104 separating high pressure chamber 84 and low pressure chamber 86 determines the flow rate of gas from high pressure chamber 84 to low pressure chamber 86. The position of valve 100 depends on the pressures in reference chamber 88 and low pressure chamber 86, and on spring force provided by spring 96 coupled to a bottom of high pressure regulator 200 on one end and to a bottom of diaphragm 98 on the other end. As the pressure in the reference chamber increases, a greater pressure is needed in low pressure chamber 86 to achieve any given position of valve 100. In these examples, pressure regulation system 34 couples low pressure regulator 301 to reference chamber 88 enabling variation of the reference chamber pressure, the reference chamber pressure in turn varying the regulating pressure in low pressure chamber 86.

As described above with respect to FIGS. 2A and 2B, under most conditions when gaseous fuel tank 20 is fluidly coupled to fuel pressure regulation system 34, high pressure chamber 84 will contain gaseous fuel at a higher pressure than the gaseous fuel contained in low pressure chamber 86. Gaseous fuel stored at a high pressure in gaseous fuel tank 20 flows to high pressure chamber 84 via high pressure fuel line 94. A quantity of gaseous fuel in high pressure chamber 84 may then be directed to low pressure chamber 86 through valve 100 such that the pressure of gaseous fuel in low pressure chamber 86 is lower than the pressure of gaseous fuel in high pressure chamber 84. In this way, a gaseous fuel may be directed to regulated fuel line 50 and further to fuel rail 52 at a pressure that is substantially lower than the fuel pressure in high pressure fuel line 94 and gaseous fuel tank 20.

In the example shown in FIG. 5A, pressure regulation system 34 includes primary valve 305. In this example, pressure regulation system 34 includes secondary fuel line 310. Low pressure regulator 301 and secondary valve 315 are shown coupled to secondary fuel line 310. Pressure relief conduit 92 is also shown coupled to secondary fuel line 310. Pressure relief conduit 92 may include orifice 320. Orifice 320 may be a fixed or variable aperture orifice. In some examples, orifice 320 may be replaced by a controllable valve.

Low pressure regulator 301 may include ports for input pressure, output pressure and a reference pressure. As shown in FIGS. 5A and 5B, a conduit may connect a reference chamber of low pressure regulator to atmosphere. In other examples, low pressure regulator 301 may have a self-connected reference pressure. In these examples, a pressure relief conduit providing a constant leak may not be required, as the low pressure regulator may be able to both increase and decrease downstream pressure in reference chamber 88.

In the examples depicted in FIGS. 5A and 5B, primary valve 305 is shown coupled to high pressure fuel line 94 upstream of high pressure regulator 300. Primary valve 305 may be actuated and de-actuated via signals from controller 12. When primary valve 305 is commanded open, gaseous fuel in high pressure fuel line 94 can flow to high pressure chamber 84 of high pressure regulator 300. Primary valve 305 may function as a fuel rail lock-off valve, and may be closed to prevent communication between pressure regulation system 34 and fuel rail 52 during conditions where gaseous fuel delivery to the engine is not desired (e.g., during engine off conditions, or during conditions where delivery of liquid fuel alone to the engine is desired). Otherwise, primary valve 305 may be opened such that fuel may be delivered from pressure regulation system 34 to fuel rail 52. In contrast to valves in systems which vary fuel rail pressure via duty cycling of a valve intermediate a pressure regulator and a fuel rail, primary valve 305 may be a simple valve which is only controllable to a fully open or fully closed state, and which does not serve to vary the pressure of fuel delivered to the fuel rail. However, in other examples, pressure regulation system 34 may duty-cycle primary valve 305 based on feedback from the fuel rail pressure sensor, such that the valve works in conjunction with or replaces the other pressure-regulating mechanisms of the systems during select operating conditions.

In the example depicted in FIG. 5A, secondary valve 315 is coupled to secondary fuel line 310 downstream of low pressure regulator 301. When secondary valve 315 is opened, gaseous fuel may flow from the fuel rail through low pressure regulator 301 into reference chamber 88 of high pressure regulator 300. In this way, pressure may be increased in the reference chamber. Increased pressure in the reference chamber raises the pressure of fuel in low pressure chamber 86 (the regulating pressure) due to the movement of diaphragm 98 towards wall 104. This in turn will increase the pressure of fuel directed to regulated fuel line 50 and downstream to fuel rail 52. By closing valve 315, reference chamber 88 ceases to be replenished, and reference chamber 88 will equilibrate to the same pressure as seen by conduit 92. The gaseous fuel exhausted from reference chamber 88 via pressure relief conduit 92 may be directed to engine system 8, for example to intake manifold 44, a crankcase, ejector vacuum, vacuum pump vacuum, or to a fuel vapor storage canister. Alternatively, the evacuated gaseous fuel may be discarded to atmosphere.

In this way, the pressure regulation system depicted in FIG. 5A can use the fuel rail pressure to adjust the pressure in the reference chamber. By controlling the position of valves 305 and 315, the pressure in regulated fuel line 50 can be controlled in turn. If primary valve 305 is closed and secondary valve 315 is also closed, there is no net flow of gaseous fuel to regulated fuel line 50 or fuel rail 52. If primary valve 305 is closed and secondary valve 315 is open, gaseous fuel may flow from fuel rail 52 to reference chamber 88 via secondary fuel line 310. In this way, the gaseous fuel will pass through low pressure regulator 301. This in turn, will raise the pressure in reference chamber 88, which will raise the pressure of low pressure chamber 86. Increasing the pressure of low pressure chamber 86 will result in an increased gaseous fuel pressure in regulated fuel line 50 and further in fuel rail 52 at a pressure substantially equal to the set value for low pressure regulator 301. This configuration, where primary valve 305 is closed and secondary valve 315 is open, may result in a first, low pressure setting that may be selected in situations where low fuel rail pressure operation, for example extreme cold cranking situations.

In another scenario, if primary valve 305 is open and secondary valve 315 is closed, reference chamber 88 will equilibrate at atmospheric pressure. Gaseous fuel will flow from the fuel tank to high pressure chamber 84, and gaseous fuel will flow from the low pressure chamber to regulated fuel line 50 and further to fuel rail 52 at a pressure substantially equal to the set value for high pressure regulator 300. This configuration, where primary valve 305 is open and secondary valve 315 is closed, may result in a second, standard pressure setting that may be selected in normal operating conditions.

In another scenario, if primary valve 305 is open and secondary valve 315 is open, gaseous fuel will flow from the fuel tank to high pressure chamber 84, and gaseous fuel will flow from fuel rail to reference chamber 88 via secondary fuel line 310, passing through low pressure regulator 301. This in turn, will raise the pressure in reference chamber 88, which will raise the pressure of low pressure chamber 86. Increasing the pressure of low pressure chamber 86 will result in an increased gaseous fuel pressure in regulated fuel line 50 and further in fuel rail 52 at a pressure substantially equal to the sum of the set values for high pressure regulator 300 and low pressure regulator 301.

In the example depicted in FIG. 5B, secondary valve 325 is coupled to secondary fuel line 310 downstream of low pressure regulator 301. In this example, secondary valve 325 is a three-way valve coupled to both secondary fuel line 310 and pressure relief conduit 92. For the purposes of this example, secondary valve 325 will be described as a three-way valve switchable between a first and second position; however, it should be appreciated that numerous other valve configurations may be used without departing from the scope of this disclosure. Secondary valve 325 may be positioned in accordance with commands received from controller 12.

Secondary valve 325 may be placed in a first position, where a first valve opening aligns with the inlet of pressure relief conduit 92, a second valve opening aligns with a portion of secondary fuel line 310 such that gaseous fuel can flow from reference chamber 88 through secondary valve 325, and a third valve opening does not align with an opening in secondary fuel line 310, such that gaseous fuel cannot flow from low pressure regulator 301 to reference chamber 88. This may be functionally equivalent to the closed position described for secondary valve 315 as shown in FIG. 5A.

For example, if secondary valve 325 moves into the first position, gaseous fuel may be evacuated out of the reference chamber to pressure relief conduit 92 via orifice 220. In this way, the reference chamber will return to steady-state pressure, thereby decreasing the regulating pressure in low pressure chamber 86. This in turn will decrease the pressure of fuel directed to regulated fuel line 50 and downstream to fuel rail 52. By actuating valve 325, reference chamber 88 ceases to be replenished, and reference chamber 88 will equilibrate to the same pressure as seen by conduit 92. The gaseous fuel exhausted from reference chamber 88 via pressure relief conduit 92 may be directed to engine system 8, for example to intake manifold 44, a crankcase, ejector vacuum, vacuum pump vacuum, or to a fuel vapor storage canister. Alternatively, the evacuated gaseous fuel may be discarded to atmosphere.

Secondary valve 325 may be placed in a second position, where all a first valve opening aligns with an inlet in secondary fuel line 310 and a second valve opening aligns with an outlet in secondary fuel line 310 such that gaseous fuel can flow from low pressure regulator 301 to reference chamber 88. This may be functionally equivalent to the open position described for secondary valve 315 as shown in FIG. 5A, although pressure relief conduit 92 may be blocked. In this conformation, gaseous fuel may flow from the fuel rail through low pressure regulator 301 into reference chamber 88 of high pressure regulator 300. In this way, pressure may be increased in the reference chamber. Increased pressure in the reference chamber raises the pressure of fuel in low pressure chamber 86 (the regulating pressure) due to the movement of diaphragm 98 towards wall 104. This in turn will increase the pressure of fuel directed to regulated fuel line 50 and downstream to fuel rail 52. In this scenario, if primary valve 305 is open while secondary valve 325 is in the second position, gaseous fuel will flow from the fuel tank to high pressure chamber 84, and gaseous fuel will flow from fuel rail to reference chamber 88 via secondary fuel line 310, passing through low pressure regulator 301. This in turn, will raise the pressure in reference chamber 88, which will raise the pressure of low pressure chamber 86. Increasing the pressure of low pressure chamber 86 will result in an increased gaseous fuel pressure in regulated fuel line 50 and further in fuel rail 52 at a pressure substantially equal to the sum of the set values for high pressure regulator 300 and low pressure regulator 301.

If primary valve 305 is closed and secondary valve 325 is in the second position, gaseous fuel may flow from fuel rail 52 to reference chamber 88 via secondary fuel line 310. In this way, the gaseous fuel will pass through low pressure regulator 301. This in turn, will raise the pressure in reference chamber 88, which will raise the pressure of low pressure chamber 86. Increasing the pressure of low pressure chamber 86 will result in an increased gaseous fuel pressure in regulated fuel line 50 and further in fuel rail 52 at a pressure substantially equal to the set value for low pressure regulator 301. This configuration, where primary valve 305 is closed and secondary valve 325 is in the second position, may result in a first, low pressure setting that may be selected in situations where low fuel rail pressure operation, for example extreme cold cranking situations.

As shown in FIG. 5B, pressure regulation system 34 may also include coalescing filter 330 coupled to regulated fuel line 50.

It should be understood that the terms "high pressure regulator" and "Low pressure regulator" (and/or "higher pressure regulator" and "lower pressure regulator" are used herein to describe the regulators in terms of the relative pressures of gaseous fuel exiting the regulators. In other words, under most circumstances, gaseous fuel exiting the high pressure regulator is regulated to a higher pressure than gaseous fuel exiting the low pressure regulator. In one example, the high pressure regulator may be a 7 bar regulator and the low pressure regulator may be a 3 bar regulator. In the example depicted in FIG. 5A, if primary valve 305 is open and secondary valve 315 is closed, gaseous fuel exiting low pressure chamber 86 will exit at a pressure of 7 Bar. If secondary valve 315 is then open, gaseous fuel will flow into reference chamber 88 at a pressure of 3 bar. In turn, gaseous fuel exiting low pressure chamber 86 will exit at a pressure of 10 Bar. In the scenario where primary valve 305 is closed and secondary valve 315 is open, gaseous fuel will flow into reference chamber 88 at a pressure of 3 Bar, and exit low pressure chamber 86 at a pressure of 3 Bar, thereby increasing the pressure of gaseous fuel in the fuel rail in a closed loop.

Pressure regulation system 34 may regulate fuel rail pressure based on electronic feedback from the fuel rail. Fuel rail pressure sensor 102 may be configured to sense the current fuel rail pressure and provide the sensed value to controller 12 of control system 14. If the current fuel rail pressure is not within a range of a desired fuel rail pressure determined based on engine operating conditions, the controller may control valves 305 and 315 to achieve the desired fuel rail pressure. An example control routine for the example pressure regulation systems depicted in FIGS. 5A and 5B is shown in FIG. 6.

Figure 6:
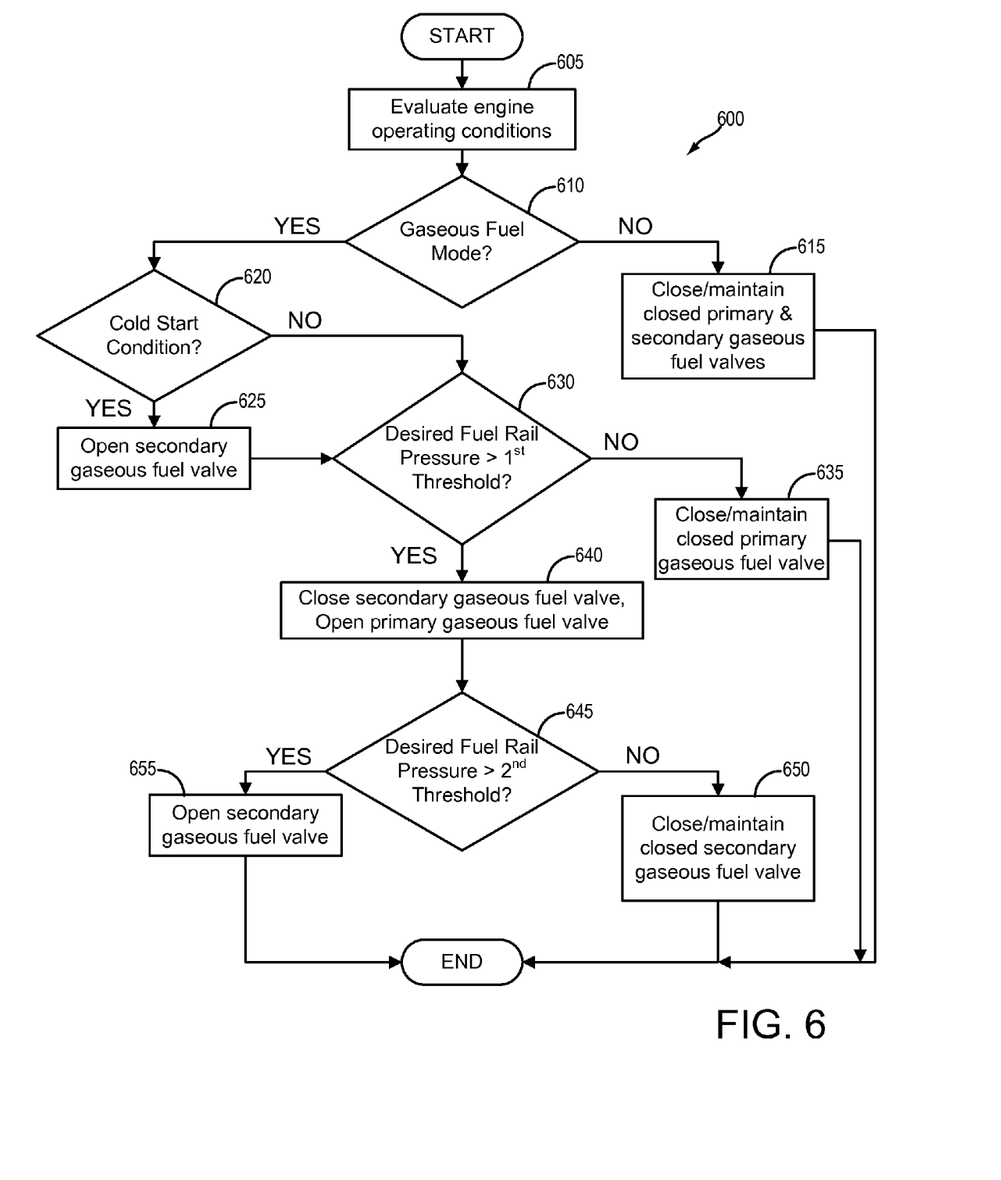
FIG. 6 shows an example high level flowchart for controlling valves of the pressure regulation system of FIGS. 5A-B.
Figure 7:
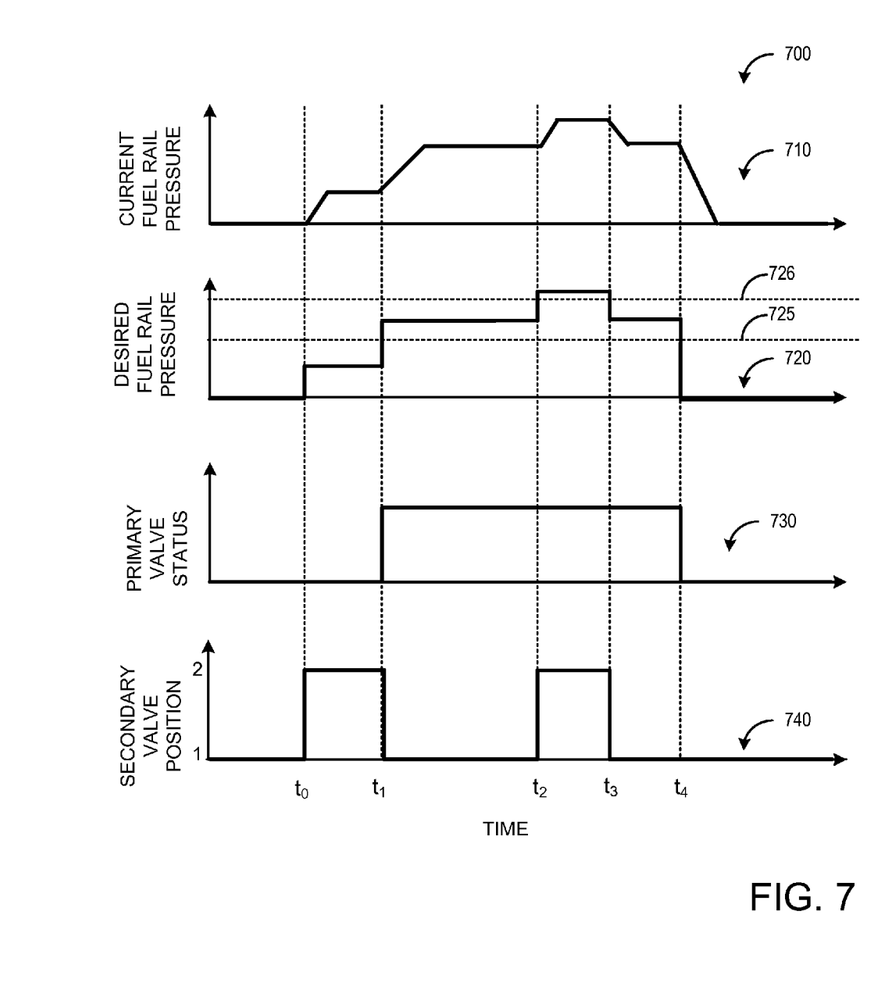
FIG. 7 shows example timing diagrams illustrating the relationship between various parameters of the pressure regulation system of FIGS. 5A-B with respect to time.

FIG. 6 shows a high-level flow chart for an example method 600 for a gaseous pressure regulator for a gaseous fuel system, such as the fuel system depicted in FIG. 1 including a gaseous fuel pressure regulator, such as pressure regulation system 34 as depicted in FIG. 5A. Method 600 may be carried out by controller 12, and may be run when the vehicle is operating, or at a key-on event. Method 600 may begin at 605 by determining engine operating conditions. Engine operating conditions may be measured, estimated or inferred, and may include various vehicle conditions, such as vehicle speed, as well as various engine operating conditions, such as engine operating mode, engine speed, engine temperature, exhaust temperature, boost level, MAP, MAF, torque demand, horsepower demand, etc.

Continuing at 610, method 600 may include determining whether the vehicle is in a gaseous fuel operation mode, or the vehicle is about to enter a gaseous fuel mode. The gaseous fuel mode may include a gaseous-fuel only mode, a bi-fuel operation mode, a hybrid-electric-gaseous fuel mode, or other operating mode where gaseous fuel is injected into at least one combustion cylinder.

If the vehicle is not operating in a gaseous fuel mode, and the vehicle is not imminently entering a gaseous fuel mode, method 600 may proceed to 615. At 615, method 600 may include closing or maintaining closed the primary and secondary gaseous fuel valves (e.g. primary gaseous fuel valve 305 and secondary gaseous fuel valve 315 as depicted in FIG. 5A). For the system depicted in FIG. 5B, this may include placing secondary gaseous fuel valve 325 in a first, decompressing position. If either or both valves are open, controller 12 may actuate the valves closed, uncoupling gaseous fuel tank 20 from gaseous fuel rail 52. Method 600 may then end.

If the vehicle is in a gaseous fuel mode, or about to enter a gaseous fuel mode, method 600 may proceed to 620. At 620, method 600 may include determining whether the vehicle is currently in a cold-start condition. This may include evaluating engine operating conditions assessed at 605, and may include determining the voltage available for fuel injection. If no cold-start routine is ongoing, method 600 may proceed to 630. If a cold-start routine is ongoing, method 600 may proceed to 625. At 625, method 600 may include opening a secondary gaseous fuel valve, such as secondary gaseous fuel valve 315 as shown in FIG. 5A. For the system depicted in FIG. 5B, this may include placing secondary gaseous fuel valve 325 in a second, permissive position. A primary gaseous fuel valve, such as primary gaseous fuel valve 305, or another lock valve on the high pressure side of high pressure regulator 300 may be closed or maintained closed concurrently with the opening of secondary gaseous fuel valve 315 or 325. As described above, in this conformation gaseous fuel may flow from fuel rail 52 to reference chamber 88 via secondary fuel line 310. In this way, the gaseous fuel will pass through low pressure regulator 301. This in turn, will raise the pressure in reference chamber 88, which will raise the pressure of low pressure chamber 86. Increasing the pressure of low pressure chamber 86 will result in an increased gaseous fuel pressure in regulated fuel line 50 and further in fuel rail 52 at a pressure substantially equal to the set value for low pressure regulator 301. This may result in a low pressure setting, allowing for low pressure fuel injection for cold starting or other scenarios where minimal voltage is available for gaseous fuel injection.

At 630, method 600 may include determining if the desired fuel rail pressure is greater than a first threshold. The first threshold may be a predetermined fuel rail pressure, or may be a function of current engine operating conditions. If this determination is performed following a cold start condition, there may be a pre-determined time period or sequence of events following the cold start condition that may elapse prior to comparing the fuel rail pressure to the first threshold. If the desired fuel rail pressure is not greater than a first threshold, method 600 may proceed to 635. At 635, method 600 may include closing or maintaining closed the primary gaseous fuel valve. Method 600 may then end.

If the desired fuel rail pressure is greater than a first threshold, method 600 may proceed to 640. At 640, method 600 may include closing or maintaining the closed state of the secondary gaseous fuel valve and opening the primary gaseous fuel valve and coupling gaseous fuel tank 20 to gaseous fuel rail 52. For the system depicted in FIG. 5B, this may include placing secondary gaseous fuel valve 325 in a first, decompressing position. As described above with regards to FIG. 5A, in this conformation reference chamber 88 will equilibrate at atmospheric pressure. Gaseous fuel will flow from the fuel tank to high pressure chamber 84, and gaseous fuel will flow from the low pressure chamber to regulated fuel line 50 and further to fuel rail 52 at a pressure substantially equal to the set value for high pressure regulator 300. This may result in a primary or standard pressure setting allowing for a fuel rail pressure that may be selected under most operating conditions.

Continuing to 645, method 600 may include determining is the desired fuel rail pressure is greater than a second threshold, the second threshold being greater than the first threshold. The desired fuel rail pressure may be calculated or estimated based on engine operating conditions, such as engine mode, available fuel levels, engine torque demand, engine power demand, etc. The threshold fuel rail pressure may be a predetermined value, or may be calculated as a function of current engine conditions. If the desired fuel rail pressure is not greater than the second threshold pressure, method 600 may proceed to 650.

At 650, method 600 may include closing or maintaining closed secondary gaseous fuel valve 315. For the system depicted in FIG. 5B, this may include placing secondary gaseous fuel valve 325 in a first, decompressing position. In this way, low pressure regulator 301 is decoupled from reference chamber 88. If gaseous fuel had been directed into reference chamber 88, the fuel may then be bled out of reference chamber 88 through pressure relief conduit 92 via orifice 320. In this way, reference chamber 88 will obtain a pressure substantially equal to atmospheric pressure. This will in turn cause the pressure in low pressure chamber 86 to drop, due to the movement of diaphragm 98 away from wall 104. In turn, gaseous fuel entering regulated fuel line 50 and further to fuel rail 52 will be supplied at a pressure substantially equal to the pre-set value for high pressure regulator 300. Method 600 may then end.

If the desired fuel rail pressure is greater than the threshold pressure, method 600 may proceed to 655. At 655, method 600 may include opening or maintaining open secondary gaseous fuel valve 315. For the system depicted in FIG. 5B, this may include placing secondary gaseous fuel valve 325 in a second, permissive position. In this way, low pressure regulator 301 is coupled to reference chamber 88. Fuel from gaseous fuel tank 20 may enter low pressure regulator 301 via secondary fuel line 310. This in turn will cause the pressure in reference chamber 88 to increase by an amount substantially equal to the pre-set value for low-pressure regulator 301. This will further increase the pressure in low pressure chamber 86 due to the movement of diaphragm 98 towards wall 104. This in turn will increase the pressure of fuel directed to regulated fuel line 50 and downstream to fuel rail 52. The pressure of fuel directed to regulated fuel line 50 and downstream to fuel rail 52 may be substantially equal to the sum of the pre-set values of high-pressure regulator 300 and low pressure regulator 301. Method 600 may then end.

Method 600 may further include determining if the desired fuel rail pressure remains above the second threshold pressure. If the desired fuel rail pressure remains above the second threshold pressure, method 600 may include maintaining the primary and secondary gaseous fuel valves in an open conformation. Method 600 may then end. If the desired fuel rail pressure has dropped below the threshold, method 600 may include closing secondary gaseous fuel valve 315. For the system depicted in FIG. 5B, this may include placing secondary gaseous fuel valve 325 in a first, decompressing position. In this way, low pressure regulator 301 is decoupled from reference chamber 88. Gaseous fuel may then be bled out of reference chamber 88 through pressure relief conduit 92 via orifice 320. In this way, reference chamber 88 will obtain a pressure substantially equal to atmospheric pressure. This will in turn cause the pressure in low pressure chamber 86 to drop, due to the movement of diaphragm 98 away from wall 104. In turn, gaseous fuel entering regulated fuel line 50 and further to fuel rail 52 will be supplied at a pressure substantially equal to the pre-set value for high pressure regulator 300. Method 600 may then end.

The high level flowchart shown in FIG. 6 may enable one or more methods. In one example, a method for an engine cold start, comprising: closing a valve coupling a gaseous fuel tank to a high pressure chamber of a first gaseous fuel regulator and opening a valve coupling a fuel rail to a reference chamber of the first gaseous fuel regulator via a second gaseous fuel regulator. In this way, the gaseous fuel already present in the fuel rail may be used to establish a low injection pressure that may be used when marginal voltage is available to open the fuel injectors, as a lower injection pressure requires a lower injector opening voltage.

FIG. 7 shows an example timing diagram 700 illustrating the relationship between various parameters of the pressure regulation system of FIG. 5A with respect to time. The timing diagram may be representative of an example pressure regulation routine, such as method 600 depicted in FIG. 6. Timing diagram 700 includes current fuel rail pressure plot 710, desired fuel rail pressure plot 720, primary valve status plot 730 and secondary valve status plot 740. Secondary valve status plot 740 shows a first and second position for the secondary valve. As described above, for the system shown in FIG. 5A, secondary valve 315 may be placed in a first, closed position or a second, open position. For the system depicted in FIG. 5B, secondary valve 325 may be placed in a first, decompressing position or a second, open position. For both valves 315 and 325, the first position decouples low pressure regulator 301 from reference chamber 88, while the second position couples low pressure regulator 301 to reference chamber 88. In this example, the default, or de-actuated position is the first position, and the actuated position is the second position.

Prior to $t_0$, the vehicle may be off, or running in a mode that does not require gaseous fuel injection. At $t_0$, the desired fuel rail pressure increases from 0 to a value less than first threshold 725. In response to this increase in desired fuel rail pressure, a secondary gaseous fuel valve is placed in a second position, as shown by plot 740. As shown by plot 720, the actuation of the secondary valve causes the fuel rail pressure to increase to the desired fuel rail pressure. In this example, actuating the secondary valve is equivalent to opening the valve at 100% duty cycle. In some examples, the valve may be opened to various duty cycles to further control the fuel rail pressure.

At $t_1$, the desired fuel rail pressure increases to a value greater than primary threshold 725, but less than secondary threshold 726. In response to this increase in desired fuel rail pressure, a primary gaseous fuel valve is actuated, as shown by plot 730. Concurrently, the secondary gaseous fuel valve is placed in the first position, as shown by plot 740. As shown by plot 710, the actuation of the primary valve and concurrent de-actuating of the secondary valve causes the fuel rail pressure to increase to the desired fuel rail pressure. In this example, actuating the primary valve is equivalent to opening the valve at 100% duty cycle. In some examples, the valve may be opened to various duty cycles to further control the fuel rail pressure.

At $t_2$, the desired fuel rail pressure increases to a value greater than second threshold 726. This may be due to a change in operating conditions, for example, an increased engine torque demand. In response to the increase in desired fuel rail pressure, a secondary gaseous fuel valve is actuated, as shown by plot 740. Concurrently, the primary gaseous fuel valve is maintained open. As shown by plot 710, the actuation of the secondary valve causes the fuel rail pressure to increase to the desired fuel rail pressure. In this example, actuating the secondary valve is equivalent to opening the valve at 100% duty cycle. In some examples, the valve may be opened to various duty cycles to further control the fuel rail pressure. As described above in reference to FIGS. 5A and 5B, actuation of the secondary valve cause gaseous fuel to flow into the reference chamber of the high pressure fuel regulator, increasing the pressure of the gaseous fuel entering the fuel rail.

At time $t_3$, the desired fuel rail pressure decreases to a value less than threshold 726 but greater than threshold 725. This may be due to a change in operating conditions, for example, a decreased engine torque demand. In response to the decrease in desired fuel rail pressure, the secondary gaseous fuel valve is de-actuated, as shown by plot 740. Concurrently, the primary gaseous fuel valve is maintained open. As shown by plot 710, the de-actuating of the secondary valve causes the fuel rail pressure to decrease to the desired fuel rail pressure. As described above in reference to FIGS. 5A and 5B, de-actuating the secondary valve causes gaseous fuel to bleed out of the reference chamber of the high pressure fuel regulator through a pressure relief conduit. This decreases the pressure of gaseous fuel entering the fuel rail.

At time $t_4$, the desired fuel rail pressure decreases to 0. This may be due to a change in operating conditions, for example, a key-off event, or the switching of engine modes. In response to the decrease in desired fuel rail pressure, the primary gaseous fuel valve is closed, as shown by plot 730. Closing the primary gaseous fuel valve decouples the gaseous fuel tank from the gaseous fuel rail. As shown by plot 710, the closing of the primary gaseous fuel valve causes the fuel rail pressure to decrease to 0.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a gaseous-fueled engine, comprising:
   a gaseous fuel tank;
   a first pressure regulator comprising a high pressure chamber coupled to the gaseous fuel tank, a low pressure chamber coupled to an engine fuel rail, and a reference chamber;
   a second pressure regulator coupled to the reference chamber;
   a first valve controlling fuel flow from the gaseous fuel tank to the engine fuel rail;
   a second valve controlling gaseous fuel flow from the second pressure regulator to the reference chamber;
   a first fuel line coupling the gaseous fuel tank to the high pressure chamber, and a second fuel line coupling the gaseous fuel tank to the reference chamber via the second pressure regulator and second valve;
   a pressure relief conduit coupled to the second fuel line downstream of the second pressure regulator and second valve, and upstream of the reference chamber; and
   a controller including memory with instructions therein for adjusting the first and second valves based on a desired fuel rail pressure,
   where the first pressure regulator is a higher pressure regulator and the second pressure regulator is a lower pressure regulator, and
   where the controller further includes memory with instructions therein for, when the first and second valves are actuated, de-actuating the second valve in response to a decrease in desired fuel rail pressure while maintaining the flow of gaseous fuel from the gaseous fuel tank to the fuel rail.

2. The system of claim 1, where the controller further includes memory with instructions therein for, when the first valve is actuated, actuating the second valve in response to an increase in desired fuel rail pressure.

3. The system of claim 1, where fuel exhausted from the reference chamber through the pressure relief conduit is routed to the engine for combustion.

4. The system of claim 1, where the pressure in the low pressure chamber is based on a spring force of a spring coupled within the reference chamber.

5. The system of claim 1, where fuel exhausted from the reference chamber through the pressure relief conduit is routed to the engine for combustion.

6. A method for regulating gaseous fuel pressure in an engine, comprising:
   actuating a first valve to flow fuel from a gaseous fuel tank to an engine fuel rail via a first pressure regulator;
   increasing a regulating pressure in a low pressure chamber of the first pressure regulator by actuating a second valve to increase a flow of gaseous fuel into a reference chamber of the first pressure regulator via a second pressure regulator; and
   when the first and second valves are actuated, de-actuating the second valve in response to a decrease in desired engine fuel rail pressure while maintaining the flow of gaseous fuel from the gaseous fuel tank to the engine fuel rail.

7. The method of claim 6, where increasing the regulating pressure in the low pressure chamber of the first pressure regulator further increases a pressure of gaseous fuel in the engine fuel rail.

8. The method of claim 6, further comprising decreasing the regulating pressure in the low pressure chamber of the first pressure regulator by closing the second valve.

9. The method of claim 8, where decreasing the regulating pressure in the low pressure chamber of the first pressure regulator further comprises exhausting gaseous fuel out of the reference chamber through a pressure relief conduit.

10. The method of claim 8, further comprising adjusting the regulating pressure in the low pressure chamber based on the desired fuel rail pressure.

* * * * *